United States Patent [19]

Ando et al.

[11] Patent Number: 5,089,134
[45] Date of Patent: Feb. 18, 1992

[54] SILICA GLASS FILTER

[75] Inventors: Kuniko Ando; Koichi Shiraishi, both of Hadano; Masaru Shimbo, Yokohama; Shunzo Shimai, Tougane, all of Japan

[73] Assignee: Toshiba Ceramics Co., Ltd., Japan

[21] Appl. No.: 633,624

[22] Filed: Dec. 26, 1990

[30] Foreign Application Priority Data

Dec. 28, 1989 [JP] Japan .................................. 1-343701
Dec. 28, 1989 [JP] Japan .................................. 1-343702
Dec. 28, 1989 [JP] Japan .................................. 1-343707

[51] Int. Cl.$^5$ ...................... B01D 24/00; B01D 39/06
[52] U.S. Cl. ...................................... 210/496; 55/487; 55/523; 210/500.26; 210/503; 210/510.1; 264/112; 264/113; 264/DIG. 48; 428/312.6; 428/325; 428/332; 428/426; 428/428
[58] Field of Search ............... 264/113, 112, DIG. 48, 264/DIG. 53, 297.1; 65/52, 53, 60.2, 60.8; 428/312.6, 325, 331, 332, 426, 428, 429; 55/97, 523, 486, 487, 488, 489; 210/500.26, 503, 509, 496, 510.1; 502/232, 407, 409; 423/324, 348

[56] References Cited

U.S. PATENT DOCUMENTS 3,369,665 2/1968 Paulson et al. ......................... 210/94
4,656,021 4/1987 Tanabe et al. ......................... 423/348
4,698,157 10/1987 Gillot ................................... 210/496
4,810,273 3/1989 Komoda ................................ 55/523

Primary Examiner—Robert A. Dawson
Assistant Examiner—Sun Uk Kim
Attorney, Agent, or Firm—Lorusso & Loud

[57] ABSTRACT

A silica glass filter comprises a porous support body composed of amorphous silica particles as a porous sintered body and having a purity of 99.9% or more and containing 150 ppm or less in total of impurities including alkali, alkali metal, heavy metal and/or elements of III B group, and a filtration layer formed on the support body. The filtration layer is composed of amorphous silica particles as a porous sintered body in a fine mode and has substantially the same purity as that of the support body.

10 Claims, 2 Drawing Sheets

SILICA GLASS FILTER

BACKGROUND OF THE INVENTION

This invention relates to a silica glass filter for filtering a gas such as a reaction gas or liquid use in semiconductor device production.

PRIOR ART

Various filters have been known. For example, a conventional filter is formed of synthetic resin such as cellulose nitrate, acetyl cellulose or polytetrafluoroethylene. Another conventional filter is formed of alumina, silicon carbide or mullite. A conventional glass filter is formed of vycor.

The conventional resin filters cannot be used to filter a hot media and some chemicals because they do not have sufficient strength. When a liquid to be filtered is circulated through a conventional resin filter, some mesh portions of the filter are widened by pressure pulsation. Thus, particles contained in the liquid pass through the widened mesh portions.

The conventional ceramic filters do not have the above problems, but they are formed of crystalline particles so as to have an entwined polyhedron-construction. When a filtrate flows through the filter, pressure loss increases while permeability decreases. On the other hand, conspicuous grain boundaries are formed among sintered particles. Impurities contained in the particles are apt to gather into the grain boundaries so that a boundary phase can be easily formed. When the boundary phase is contacted by chemicals, the impurities are solved out of the grain boundaries. Thus, its strength decreases.

In the conventional glass filters, boron and alkali ions are apt to be solved out of the filters and flow into a filtrate.

SUMMARY OF THE INVENTION

Therefore, the object of this invention is to provide a silica glass filter which has good chemical resistance, a large permeability and a large filtration area.

According to this invention, a silica glass filter comprises a porous support body composed of amorphous silica particles as a porous sintered body and having a purity of 99.9% or more and containing 150 ppm or less in total of impurities including alkali, alkali metal, heavy metal and/or elements of group III B of the periodic tab, (B, Al, Ga, In and Tl), and a filtration layer formed on the support body. The filtration layer is composed of fine amorphous silica particles as a porous sintered body and has substantially the same purity as that of the support body.

The support body and the layers are not formed of crystalline particles but formed of amorphous silica particles. Therefore, no boundary phase is present.

In a preferred mode of this invention, the silica glass filter inlcudes further one or more intermediate layers formed between the support body and the filtration layer and composed of amorphous silica particles as a porous sintered body and having substantially the same purity as that of the support body. If the intermediate layer is unitary, it has particle sizes which are smaller than the support body and larger than the filtration layer. For the best results, the thickness of the intermediate layer has $\frac{1}{2}$ or more of the average pore diameter of the support body, and the particle size of the intermediate layer is $\frac{1}{2}$ or more of the average pore diameter of the support body as well as equal or less than the average particle diameter of the support body. In case of plural intermediate layers, the particles of one intermediate layer (No. m) will have an average particle diameter which is $\frac{1}{2}$ or more of the average pore diameter of the next inner intermediate layer (No.m-1) and equal to or less than the average particle diameter thereof. The particles of the innermost intermediate layer have an average particle diameter which is $\frac{1}{2}$ or more of the average pore diameter of the filtration layer and equal to or less than the average particle diameter thereof. In such a case, small particles are not inserted into relatively large pores, and the pore diameters gradually increase in the filtration direction. Thus, filtration efficiency can be increased and maintained good for a long time.

The thickness of the filtration layer is preferably 10 to 500 times as large as the diameter of the particles of the filtration layer.

The thickness of the intermediate layer is larger than $\frac{1}{2}$ the average pore diameter of the support body.

A filter apparatus includes a silica glass filter as described above and a casing made of silica glass having a purity of 99.9 % or more and containing 150 ppm or less in total of impurities including alkali, alkali metal, heavy metal and/or elements of group III B of the periodic table and composed of amorphous silica particles as a sintered body having no gas or liquid permeability, the filter being set in the casing so as to filter a fluid flowing through the casing.

The support body and the layer or layers are preferably formed of powder containing 75wt. % or more of particles having particle sizes ranging within +50% to −50% the average particle sizes of the support body and the layers. The pore diameters of the layers are relatively uniform without blinding. The porosity can be moderately large.

The porosity of the support body is preferably less than 60% as its strength can be good. Its porosity is preferably more than 10% because at a lower porosities pressure loss is increased and transmission factor is decreased.

A thickness of the filter layer is preferably 10 to 500 times as large as the size of particles thereof. If it is less than 10 times, pin holes are apt to be formed. If it is more than 500 times, pressure loss is increased and the transmission factor is decreased.

If particles of the support body and/or the layers are substantially spherical in shape, the surfaces become flat so that a fluid to be filtered can smoothly flow. Therefore, pressure loss is decreased and the transmission factor is increased.

If the support body and the layers are asymmetric, filtration area is increased.

If the filter is formed of amorphous silica particles which are homogeneous, a boundary phase containing segregated impurities is not formed. Therefore, it is good in chemical resistance and has enough strength.

When a gas is filtered by a silica glass filter, negative static electric charge is remarkably increased so that fine dust, particularly positively charged particles, can be easily captured.

PREFERRED EMBODIMENTS

Figure 2:
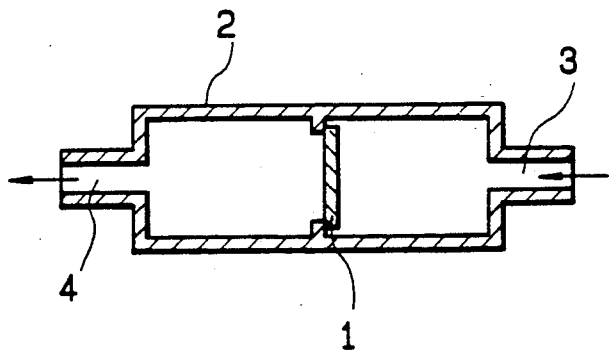
FIGS. 2 to 4 are schematic sectional views showing three types of size separating units equipped with a silica glass filter according to this invention.

As shown in FIG. 2, a filter 1 is placed in a casing 2 made of silica glass so as to form a size separating unit having an inlet 3 and an outlet 4.

Figure 3:
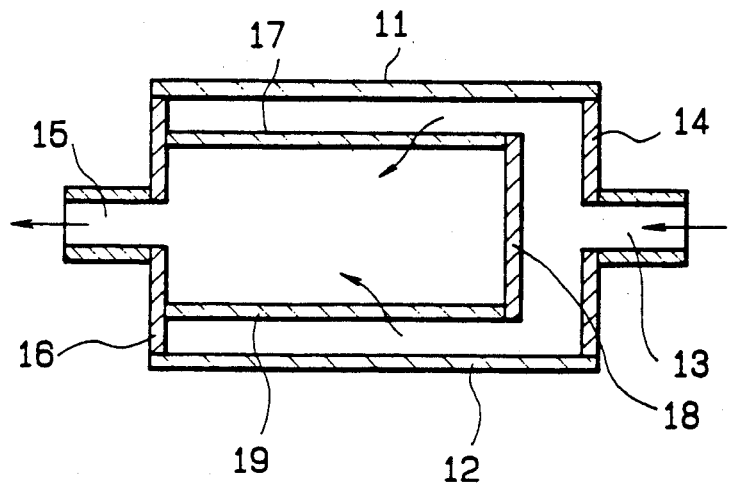

FIG. 3 shows another size separating unit including a casing 11 consisting of a cylindrical portion 12, a right end plate 14 having an inlet 13 and a left end plate 16 having an outlet 15 which are joined by a melting method in a air-tight construction. A cylindrical filter 17 is placed in the casing 11 and includes a cylindrical portion 19 and an end plate 18 fixed to a right end thereof. The filter 17 covers the outlet 15.

Figure 4:
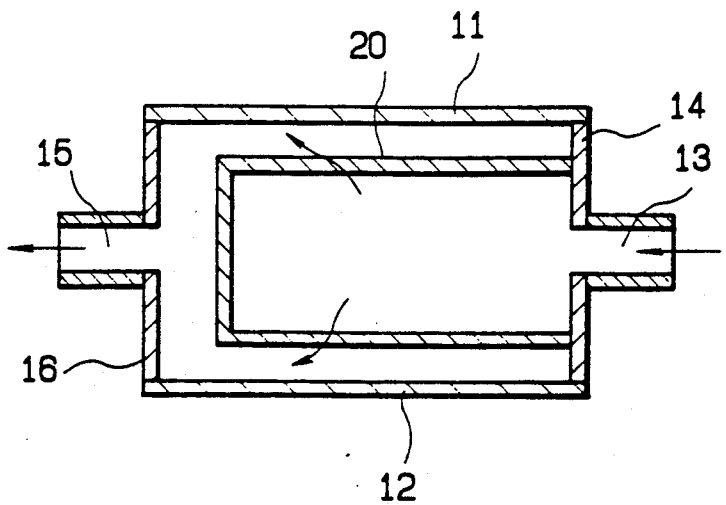

FIG. 4 shows a further size separating unit which is substantially the same as that of FIG. 3 except that the filter 20 has no end plate.

The casing 2, 11 and the end plate 18 have a purity of 99.9% or more and contain 150 ppm or less in total of impurities including alkali, alkali metal, heavy metal and/or elements of group III B of the periodic table and are composed of amorphous silica particles as a sintered body and have no gas or liquid permeability.

How to produce the filters 1, 17, 20 will be explained by way of example:

EXAMPLE 1

A synthetic silica 9lass cullet was produced by a flame fusion method. That is, silicon tetrachloride ($SiCl_4$) was thermally decomposed by oxygen-hydrogen flame so as to obtain silica ($SiO_2$) in the form of a cullet. The cullet was milled in a dry manner by a ball mill made of silica glass so as to make silica powder having an average particle size or diameter of 15 microns. Impurities contained in the silica powder are shown in Table 1.

TABLE 1

| | Na | K | Li | Fe | Al | Ca | Mg | Cu | Ti |
|---|---|---|---|---|---|---|---|---|---|
| concentration (ppm) | 0.5 | 0.1 | 0.1 or less | 0.1 | 0.1 | 0.1 or less | 0.1 or less | 0.1 or less | 0.1 or less |

The powder was classified to obtain a size fraction in the range of 10-20 micron. After that, the powder was mixed with water and then formed into a disk having a diameter of 15 mm and a thickness of 2 mm by slip casting. The disk was baked at 1500° C. so as to make a porous sintered support body composed of amorphous silica particles.

On the other hand, a synthetic silica glass cullet was produced by flame fusion and then milled in a wet manner by a ball mill made of silica glass so as to make a slurry containing silica powder having an average particle size of 3 microns. The slurry flowed on a surface of the support body so that a layer was formed thereon. Then it was baked at 1200° C. The layer on the support body was composed of amorphous silica particles as a sintered body having a fine porous construction. The filter had an asymmetric construction in section.

This filter was made of silica having a purity of 99.9% or more. The impurities contained in the filter are shown in Table 2.

TABLE 2

| | Na | K | Li | Fe | Al | Ca | Mg | Cu | Ti |
|---|---|---|---|---|---|---|---|---|---|
| concentration (ppm) | 0.7 | 0.2 | 0.1 or less | 0.1 | 0.2 | 0.1 or less | 0.1 or less | 0.1 or less | 0.1 or less |

EXAMPLE 2

A similar support body and slurry were produced substantially in the same manner as Example 1 except that the slurry contained silica powder having an average particle size of 3 microns.

The slurry was classified to botain a size fraction in the range of 1 to 5 microns in a wet manner. The classified slurry was spread over a surface of the support body so that a layer was formed thereon. Then it was baked at 1200° C. The layer was composed of amorphous silica particles as a sintered body having a fine porous construction. The layer had an asymmettic construction in section.

COMPARATIVE EXAMPLE 1

A support body and slurry were produced substantially in the same manner as Example 1. However, the silica powder had an average particle size of 15 microns and was not classified. The powder was mixed with water and then formed into a disk having a diameter of 15 mm and a thickness of 2 mm by slip casting. The disk was baked at 1500° C. so as to make a porous sintered support body formed of amorphous silica particles. A layer was formed on the support body as in Example 1.

The pores in the support bodies of Example 2 and Comparative Example 1 were measured. Relationships between size and volume thereof are shown by lines A (Example 2) and B (Comparative Example 1) in FIG. 1.

Figure 1:
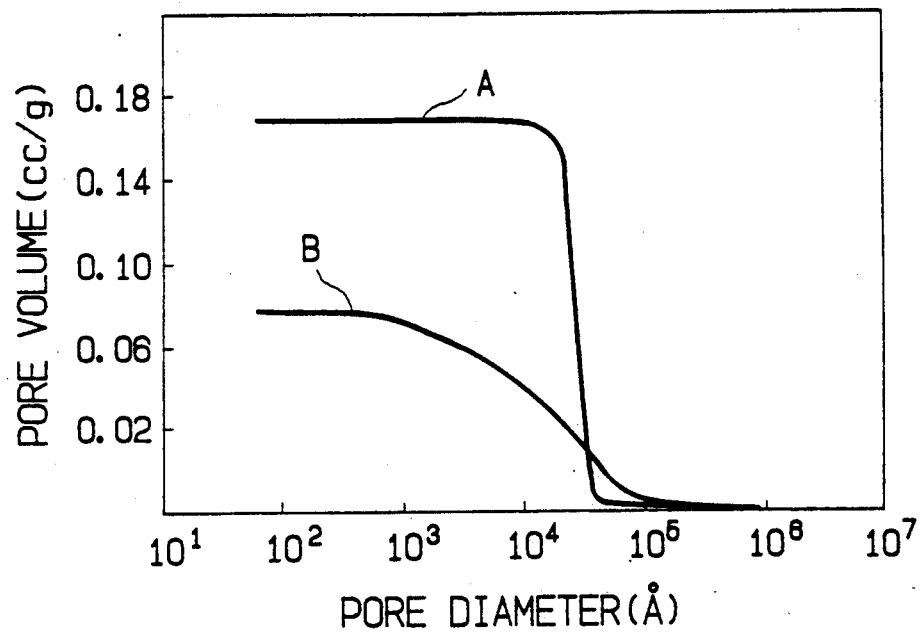
FIG. 1 is an explanatory view showing relationships between size and volume of pores in a silica glass filter of Example 2 according to this invention.

As shown in FIG. 1, if classified powder and slurry are used, the volume of the pores becomes large and the sizes or diameters of the pores become uniform.

Also, the permeability was measured. A nitrogen gas was passed through the filters of Example 2 and Comparative Example 1. With a pressure drop of 0.5 Kgf.cm$^{-2}$, the permeability of Example 2 was 100 m$^3$/(hr·m$^2$) and the permeability of Comparative Example 1 was 30 m$^3$/(hr·m$^2$).

Thus, permeability can be increased if classified powder and slurry are used.

EXAMPLE 3

Silica powder having an average particle size of 15 microns was produced in the same manner as Example 1. The powder became spherical in a flame and then was classified into two groups of 10-20 microns and 1-5 microns.

The spherical powder in the range of 10-20 micron meters was mixed with water and formed into a disk having a diameter of 15 mm and a thickness of 2 mm by slip casting like in Example 1. The disk was baked at 1500° C. so as to make a sintered support body composed of amorphous silica particles.

On the other hand, the spherical powder in the range of 1-5 microns was mixed with water so as to make a slurry. The slurry was spread over a surface of the support body so that a layer was formed thereon. Then it was baked at 1200° C. The layer was composed of amorphous silica particles as a sintered body having a fine porous construction. The layer was asymmetric construction in section.

COMPARATIVE EXAMPLE 2

The same support body as that of Example 2 was produced. Amorphous silica powder classified in the range of 1-5 microns was mixed with water so as to make a slurry. The slurry was spread over a surface of the support body so that a layer was formed thereon. Then it was baked at 1200° C. The layer was composed of amorphous silica particles as a sintered body having a fine porous construction and was asymmetric in section.

The permeability of the filters were tested. A nitorogen gas was passed through the filters of Example 2 and Comparative Example 2. With a pressure drop of 0.5 Kgf·cm$^{-2}$, the permeability of Example 3 was 600 m$^3$·hr$^{-1}$·m$^{-2}$ and the permeability of Comparative Example 2 was 400 m$^3$·hr$^{-1}$·m$^{-2}$.

Thus, the permeability can be improved if classified spherical powder and classified slurry are used.

EXAMPLE 4

The same support body as that of Example 3 was produced. Ethanol 1500 ml and 29% aqueous ammonia 200 ml were mixed in a reaction container made of silica glass and equipped with a stirrer so as to make a reaction liquid. Ethanol 1000 ml and tetraethoxysilane 250 ml were mixed so as to make a feed liquid. This liquid was dripped into the reaction liquid at 20° C. while it was stirred for 8 hours, thereby to make a slurry containing spherical mono-dispersed silica powder having a diameter of 0.4 microns. The slurry was spread over a surface of the support body so that a layer was formed thereon. Then it was baked at 1150° C. to produce a sintered body of amorphous silica particles having a fine porous construction. The layer was asymmetric in section.

The pores in this filter had a diameter of 0.2 microns. A nitrogen gas was filtered by the size separating unit of FIG. 2. The filtered gas flowed onto a 6-inch silicon wafer (not shown). The number of particles or dusts having a size of 0.1 microns was counted by a surface dust counter. The results are shown in Table 3. Table 3 shows also comparative test results of an alumina filter.

TABLE 3

| Filter | size of pore (microns) | the number of counted particles |
| --- | --- | --- |
| silica glass filter | 0.2 | 29 |
| alumina filter | 0.2 | 42 |

If a silica glass filter is used, collection efficiency is higher in comparison with an alumina filter.

EXAMPLE 5

The same silica glass filter as that of Example 4 was made. The slurry contained a spherical mono-dispersed silica powder having a particle size of 0.4 microns like in Example 4. The slurry was spread over a surface of the filter so that a spherical mono-dispersed silica powder layer was formed thereon. It was baked at 1150° C. These steps were repeated. As a result, a plurality of filter layers were formed so that the thickness of the layers increased gradually as shown in Table 4.

A nitrogen gas was passed through the filter layers in order to measure the permeability. The results are shown in Table 4. The pressure loss was 0.5 kgf·cm$^{-2}$.

TABLE 4

| Thickness of filter layers | particle size | permeability (m$^3$·hr$^{-1}$·m$^{-2}$) |
| --- | --- | --- |
| 2 | 5 | Pin holes were formed. |
| 5 | 12.5 | 1000 |
| 30 | 75 | 800 |
| 110 | 275 | 400 |
| 200 | 500 | 50 |
| 300 | 750 | 4 |

The total thickness of filter layers was preferably 10-500 times as large as the size of particles constituting them. If it is less than 10 times, pin holes are easily formed. If it is more than 500 times, permeability is decreased.

EXAMPLE 6

Silica powders of various particle sizes were prepared in Example 1. Each powder was mixed with water and then formed into a disk having a diameter of 15 mm and a thickness of 2 mm. The disks were baked at 1500° C. so as become sintered support bodies composed of amorphous silica particles. The support bodies had various porosities as shown in Table 5.

The same slurry as that of Example 4 was spread over a surface of each support body so that a layer was formed thereon. The slurry contained a spherical mono-dispersed silica powder having a particle size of 0.4 microns. The layer was baked at 1500° C. so that it was composed of amorphous silica particles as a fine sintered body having a porous construction.

The nitrogen gas permeability of each filter was measured. The results are shown in Table 5. The pressure loss was 0.5 kgf·cm$^{-2}$.

TABLE 5

| porosity (%) | permeability m$^3$·hr$^{-1}$·m$^{-2}$ |
| --- | --- |
| 4 | — |
| 7 | — |
| 10 | 10 or less |
| 17 | 50 |
| 24 | 190 |
| 32 | 380 |
| 52 | 380 |

Therefore, a support body preferably has a porosity of 10% or more.

EXAMPLE 7

The same support body as that of Example 3 was produced.

Ethanol 1500ml and 29% aqueous ammonia 100ml were mixed in a reaction container made of silica glass and equipped with a stirrer so as to make a reaction liquid. Ethanol 1000ml and tetraethoxysilane 200ml were mixed so as to make a feed liquid. This liquid was dripped into the reaction liquid at 20° C. while it was stirred for 8 hours, so as to make a slurry containing spherical mono-dispersed silica powder having a diameter of 0.2 microns. The slurry was spread over a surface of the support body so that a layer was formed thereon. Then it was baked at 1050° C. The layer was composed of amorphous silica particles as a sintered body having a fine porous construction and was asymmetric in section.

The pores of this filter had a size of 0.1 microns.

The permeabilities to nitrogen gas and pure water and porosity of the filter were measured. The results are shown in Tables 6, 7 and 8. Also, corresponding properties of an alumina filter and a vycor glass filter are shown.

TABLE 6

| filter | size of pore (microns) | gas permeability ($m^3 \cdot hr^{-1} \cdot m^{-2}$) pressure loss of 0.5 kgf·cm$^{-2}$ | pressure loss of 1 kgf·cm$^{-2}$ |
|---|---|---|---|
| silica glass filter | 0.1 | 380 | 800 |
| alumina filter | 0.1 | 350 | 700 |
| vycor glass filter | 0.1 | 300 | 650 |

TABLE 7

| filter | size of pore (microns) | liquid permeability ($m^3 \cdot hr^{-1} \cdot m^{-2}$) pressure loss of 0.5 kgf·cm$^{-2}$ | pressure loss of 1 kgf·cm$^{-2}$ |
|---|---|---|---|
| silica glass filter | 0.1 | 4.0 | 8.0 |
| alumina filter | 0.1 | 3.5 | 7.0 |
| vycor glass filter | 0.1 | 4.0 | 8.0 |

TABLE 8

| filter | size of pores (microns) | porosity (%) |
|---|---|---|
| silica glass filter | 2 | 40 |
| alumina filter | 2 | 35 |

The glass filter was produced as a porous vycor body.

The silica glass filter of Example 7 had gas permeability, liquid permeability and porosity equal to or better than an alumina filter.

Various gases and liquids were filtered through the filter of Example 7 mounted in the size separation unit of FIG. 2. The results and its chemical resistance are shown in Table 9. Corresponding properties of an alumina filter are also shown in Table 9.

In Table 9, 0, * and X denote good, possible, failure, respectively.

TABLE 9

| fluid to be filtered | silica glass filter | alumina filter |
|---|---|---|
| air | O | O |
| $N_2$ | O | O |
| $O_2$ | O | O |
| HCl | O | * |
| $Cl_2$ | O | * |
| $SiCl_4$ | O | * |
| $B_2H_2$ | O | O |
| $H_2SO_4$ | O | * |
| $HNO_3$ | O | * |
| $H_2O$ | O | * |
| HF | X | * |

The silica glass filter resists acids except hydrofluroic acid.

20% $H_2SO_4$ liquid was filtered by the silica glass filter of Example 7. Concentration of impurities contained in the filtered liquid was measured. The results are shown in Table 10. Test results are also shown for an alumina filter.

TABLE 10

| | concentration (ppb) | |
|---|---|---|
| element | silica glass filter (Pore size is 0.1 microns.) | alumina filter (Pore size is 0.1 microns.) |
| Na | 10 | 80 |
| Ca | 10 or less | 30 |
| K | 10 or less | 10 |
| Al | 30 | 500 |
| Fe | 10 or less | 80 |
| Cr | 10 or less | 10 or less |
| Ni | 10 or less | 10 or less |
| Cu | 10 or less | 10 or less |

If a silica glass filter is used, impurities are effectively filtered and removed.

EXAMPLE 8

The same silica powder as that of Example 1 was prepared and mixed with water and then formed into a disk having a diameter of 15 mm and a thickness of 2 mm by slip casting. The disk was baked at 1500° C. so as to make a porous sintered support body composed of amorphous silica particles and had an average particle size of 8 microns.

On the other hand, a synthetic silica glass cullet was produced by flame fusion and then milled in a wet manner by a ball mill made of silica glass so as to make a slurry containing silica powder having an average particle size of 4 microns. The slurry was spread over a top surface of the support body so that an intermediate layer was formed thereon until it had a thickness of 5 microns. Then it was baked at 1300 ° C. The intermediate layer on the support body was composed of amorphous silica particles as a sintered body having a fine porous construction.

Next, a synthetic silica 9lass cullet produced by flame fusion was milled in a wet manner by a ball mill made of silica glass so as to make a slurry containing silica powder having an average particle size of 2 microns. The slurry was spread over a surface of the intermediate layer so that a filtration layer was formed thereon. Then it was baked at 1200 ° C. The filtration layer on the intermediate layer was composed of amorphous silica particles as a sintered body having a fine porous construction. The support body, the intermediate layer and the filtration layer constitute an asymmetric construction.

This silica glass filter was made of silica having a purity of 99.9 % or more. The impurities contained in the filter are shown in Table 11.

TABLE 11

| Element | Na | K | Li | Fe | Al | Ca | Mg | Cu | Ti |
|---|---|---|---|---|---|---|---|---|---|
| concentration (ppm) | 0.7 | 0.3 | 0.1 or less | 0.1 | 0.3 | 0.1 or less | 0.1 or less | 0.1 or less | 0.1 or less |

COMPARATIVE EXAMPLE 3

The same slurry as that of Example 8 was prepared so as to contain silica powder having an average particle size of 2 microns and was spread over a surface of the same support body as that of Example 8 so that an intermediate layer was formed thereon. Then it was baked at 1200° C. The intermediate layer on the support body was composed of amorphous silica particles as a sintered body having a fine porous construction.

The step of forming such an intermediate layer was repeated and finally a filtration layer was formed on the last intermediate layer as shown in Table 12. The permeability test results are shown in Table 12. A pure water was passed through the filters of Examples 8-1 to 8-14 and Comparative Examples 3-1 to 3-4. Pressure loss was 0.5 Kgf·cm$^{-2}$.

Effective filtration area and bonding between the support body and the filtration layer can be increased if the thickness of the intermediate layer or layers is larger than ½ of the average pore diameter of the support body.

TABLE 12

|  |  | Thickness of intermediate layer or layers (micron meters) | Thickness of filtration layer (micron meters) | Permeability ($m^3 \cdot hr^{-1} \cdot m^{-2}$) |
|---|---|---|---|---|
| Example | 8-1 | 3 | 5 | X |
|  | 8-2 | 3 | 10 | X |
|  | 8-3 | 3 | 25 | X |
|  | 8-4 | 3 | 40 | X |
|  | 8-5 | 3 | 80 | 20 |
|  | 8-6 | 5 | 25 | X |
|  | 8-7 | 5 | 40 | 50 |
|  | 8-8 | 5 | 80 | 20 |
|  | 8-9 | 10 | 25 | 110 |
|  | 8-10 | 10 | 40 | 50 |
|  | 8-11 | 10 | 80 | 20 |
|  | 8-12 | 20 | 25 | 110 |
|  | 8-13 | 20 | 40 | 50 |
|  | 8-14 | 20 | 80 | 20 |
| Compar. Example | 3-1 | 0 | 25 | X |
|  | 3-2 | 0 | 40 | X |
|  | 3-3 | 0 | 80 | X |
|  | 3-4 | 0 | 120 | 1 |

The reference X denotes that at least one pin hole is formed.

EXAMPLE 9

Silica powder having an average particle size of 25 microns was produced in the same manner as Example 8 and then classified to obtain a fraction with particle sizes in the range of 20-30 microns. The powder was shaped by a press machine so as to form a disk having a diameter of 15 mm and a thickness of 2 mm. The disk was baked at 1500° C. so as to make a sintered support body composed of amorphous silica particles and having an average pore diameter of 10 microns and a porous construction.

Also, synthetic quartz glass powder was milled in a wet condition so as to produce a slurry containing silica powder having an average particle diameter of 10 microns. The slurry was spread over a surface of the support body so that a first intermediate layer was formed thereon. It was baked at 1400° C. The first intermediate layer was composed of amorphous silica particles as a sintered body having a porous construction with an average thickness of 80 microns.

On the other hand, the same slurry as that of Example 8 was produced so as to contain silica powder having an average particle diameter of 4 microns and then spread over a surface of the first intermediate layer so that a second layer was formed. It was baked at 1300° C. The second intermediate layer was composed of amorphous silica particles as a sintered body having a porous construction with an average thickness of 20 microns.

Next, the same slurry as that of Example 8 was produced so as to contain silica powder having an average particle diameter of 1 micron and then spread over a surface of the second intermediate layer so that a filtration layer was formed. It was baked at 1200° C. The filtration layer was composed of amorphous silica particles as a sintered body having a porous construction. The support body, the intermediate layers and the filtration layer constitute an asymmetric construction. The pore diameter of the filtration layer was 0.4 microns.

Support bodies were produced in the same manner as Example 9 so as to have average particle diameters of 15 and 8 microns. Like in Example 9, two intermediate layers were formed on each support body as shown in Table 13 by using silica powders of various average diameters, and a filtration layer having an average particle diameter of 1 micron, a thickness of 10 microns and a pore diameter of 0.4 micron was formed on the last intermediate layer, to thereby produce various silica glass filters. The permeability test results for the filters are shown in Table 13. Average particle diameters and average pore diameters are shown. The reference x denotes forming of at least one pin hole.

TABLE 13

| Example No. | First intermediate layer (microns) | | | Second intermediate layer (microns) | | | Permeability ($m^3 \cdot hr^{-1} \cdot m^{-2}$) |
|---|---|---|---|---|---|---|---|
|  | Particle | Pore | Thickness | Particle | Pore | Thickness |  |
| 9-1 | 2 | 1 | 40 | — | — | — | x |
| 9-2 | 2 | 1 | 80 | — | — | — | 1 |
| 9-3 | 4 | 2 | 40 | — | — | — | 8 |
| 9-4 | 4 | 2 | 40 | 2 | 1 | 40 | 2 |
| 9-5 | 4 | 2 | 80 | 2 | 1 | 80 | 1 |
| 9-6 | 8 | 4 | 40 | 2 | 1 | 40 | 2 |
| 9-7 | 8 | 4 | 40 | 4 | 2 | 40 | 8 |
| 9-8 | 8 | 4 | 40 | 4 | 2 | 80 | 3 |
| 9-9 | 8 | 4 | 40 | 6 | 3 | 40 | x |
| 9-10 | 10 | 5 | 40 | 2 | 1 | 40 | x |
| 9-11 | 10 | 5 | 40 | 4 | 2 | 40 | x |
| 9-12 | 10 | 5 | 40 | 6 | 3 | 40 | x |

As shown in Table 13, if Examples 9-1, 9-10 and 9-11 are compared with Examples 9-2 to 9-8, in the case of at least two intermediate layers, it can be observed that the particles of any intermediate layer preferably have an average pore diameter larger than ½ of the average pore diameter of the next inner intermediate layer and an average particle diameter less than the average particle diameter thereof. Also, it can be observed that the particles of the last intermediate layer preferably have an average pore diameter less than ½ of the average particle diameter of the filtration layer so that no pin holes are formed even if the thickness of the filtration layer is small.

EXAMPLE 10

Silica powder having an average particle size of 30 microns was produced in the same manner as Example 8. The powder became spherical in a flame and then was classified into two fractions of 25-35 microns and 1-5 microns, respectively.

The spherical powder in the range of 25-35 microns was formed into a disk having a diameter of 15 mm and a thickness of 2 mm. The disk was baked at 1500° C. so as to make a sintered support body composed of amorphous silica particles and having an average pore diameter of 15 microns.

On the other hand, the spherical powder in the range of 1-5 microns was mixed with water so as to make a slurry. The slurry was spread over a top surface of the support body so that an intermediate layer was formed thereon. Then it was baked at 1300° C. The intermediate layer was composed of amorphous silica particles as a sintered body having a fine porous construction.

On the other hand, according to the Stober method, ethanol 1500 ml and 29% aqueous ammonia 100 ml were mixed in a reaction container made of silica glass and equipped with a stirrer so as to make a reaction liquid. Ethanol 1000 ml and tetraethoxysilane 200 ml were mixed so as to make a feed liquid. This feed liquid was dripped into the reaction liquid at 20° C. while it was stirred for 8 hours, thereby to make a slurry containing spherical mono-dispersed silica powder having a diameter of 0.2 microns.

The slurry was spread over a top surface of the intermediate layer so that a filtration layer was formed thereon. Then it was baked at 1200° C. It was composed of amorphous silica particles as a sintered body having a fine porous construction. The support body, the intermediate layer and the filtration layer constituted an asymmetric layer construcion in section.

The pores in this filter had a diameter of 0.1 micron.

The filters were used to filter a nitrogen gas for the purpose of measuring properties thereof. The test results are shown in Tables 14, 15 and 16. The vycor glass filter is a glass filter produced by a vycor method and had a porous body.

TABLE 14

| Filter | diameter of pores (microns) | gas permeability ($m^3 \cdot hr^{-1} \cdot m^{-2}$) | |
|---|---|---|---|
| | | pressure loss of 0.5 kgf·cm$^{-2}$ | pressure loss of 1 kgf·cm$^{-2}$ |
| silica glass filter | 0.1 | 380 | 800 |
| alumina filter | 0.1 | 350 | 700 |
| vycor glass filter | 0.1 | 300 | 650 |

TABLE 15

| Filter | diameter of pores (microns) | liquid permeability ($m^3 \cdot hr^{-1} \cdot m^{-2}$) | |
|---|---|---|---|
| | | pressure loss of 0.5 kgf·cm$^{-2}$ | pressure loss of 1 kgf·cm$^{-2}$ |
| silica glass filter | 0.1 | 4.0 | 8.0 |
| alumina filter | 0.1 | 3.5 | 7.0 |
| vycor glass filter | 0.1 | 4.0 | 8.0 |

TABLE 16

| Filter | pore diameter (microns) | porosity (%) |
|---|---|---|
| silica glass filter | 0.1 | 40 |

TABLE 16-continued

| Filter | pore diameter (microns) | porosity (%) |
|---|---|---|
| alumina | 0.1 | 35 |

It can be observed that the silica glass filter has gas permeability, liquid permeability and porosity equal or better than those of the alumina filter.

The test results of the silica glass filter for chemical resistance are shown in Table 17. Various gases and liquids were filtered throught he filters. The properties of an alumina filter are also shown in Table 17 in which O, * and X denote good, possible, failure, respectively.

TABLE 17

| fluid to be filtered | silica glass filter | alunima filter |
|---|---|---|
| air | O | O |
| $N_2$ | O | O |
| $O_2$ | O | O |
| HCl | O | * |
| $Cl_2$ | O | * |
| $SiCl_4$ | O | * |
| $B_2H_2$ | O | O |
| $H_2SO_4$ | O | * |
| $HNO_3$ | O | * |
| $H_2O$ | O | * |
| HF | X | * |

The silica glass filter can resist acids except hydrofluoric acid.

20% $H_2SO_4$ liquid was filtered by the silica glass filter of Example 10. Impurities contained in the filtered liquid was measured. The results are shown in Table 18. Test results are also shown in case of an alumina filter.

TABLE 18

| | concentration (ppb) | |
|---|---|---|
| element | silica glass filter (Pore size is 0.2 microns.) | alumina filter (Pore size is 0.1 microns.) |
| Na | 20 | 110 |
| Ca | 10 | 45 |
| K | 10 | 15 |
| Al | 35 | 520 |
| Fe | 10 | 90 |
| Cr | 10 or less | 10 |
| Ni | 10 or less | 10 |
| Cu | 10 or less | 10 |

If the silica glass filter is used, impurities can be effectively filtered.

EXAMPLE 11

Silica powder having an average particle size of 15 microns was produced in the same manner as Example 8. The powder was classified to obtain a fraction having particles in the range of 10-20 microns. The classified powder was mixed with water and then formed into a disk having a diameter of 15 mm and a thickness of 2 mm. The disk was baked at 1500° C. so as to make a sintered support body composed of amorphous silica particles and having an average pore diameter of 8 microns.

On the other hand, like in Example 8, two types of silica powders were mixed with water so as to make two slurries having average particle diameters of 4 and 2 microns, respectively. The slurries were classified in a wet manner into a 3-6 micron slurry and a 1-3 micron slurry.

The 3-6 micron slurry was spread over a top surface of the support body so that an intermediate layer was formed thereon. Then it was baked at 1300° C. The intermediate layer was composed of amorphous silica particles as a sintered body having a fine porous construction and a thickness of 5 microns.

Next, the 1-3 micron slurry was spread over a top surface of the intermediate layer so that a filtration layer was formed thereon. Then it was baked at 1200° C. The filtration layer was composed of amorphous silica particles as a sintered body having a fine porous construction and a thickness of 80 microns. The support body, the intermediate layer and the filtration layer constituted an asymmetry layer construction in section.

The filter of Example 11 was compared with the filter of Example 8-5 regarding pure water permeability. The test results are shown in Table 19.

TABLE 19

| | permeability ($m^3 \cdot hr^{-1} \cdot m^{-2}$) |
|---|---|
| Example 11 | 30 |
| Example 8-5 | 20 |

What is claimed is:

1. A silica glass filter comprising:
 a porous sintered support body composed of first amorphous silica particles and having a purity of 99.9% or more, containing 150 ppm or less total impurities of the group consisting of alkali, alkali metal, heavy metal and elements of III B group of the periodic table; and
 a filtration layer formed on the support, said filtration layer being a sintered body composed of second amorphous silica particles having substantially the same purity as that of the support body.

2. A silica glass filter as claimed in claim 1 further comprising:
 a porous sintered intermediate layer formed between the support body and the filtration layer and composed of third amorphous silica particles having substantially the same purity as that of the support body, said third amorphous silica particles having sizes smaller than the sizes of said first amorphous silica particles of the support body and larger than the sizes of said second amorphous silica particles of the filtration layer.

3. A silica glass filter as claimed in claim 1, wherein the thickness of the filtration layer is 10 to 500 times as large as the diameter of the particles of the second amorphous silica filtration layer.

4. A silica glass filter as claimed in claim 1, wherein the support body has a porosity of 10% to 60%.

5. A silica glass filter as claimed in claim 1, wherein siad first and second amorphous silica particles are spherical.

6. A silica glass filter as claimed in claim 1, wherein the thickness of the intermediate layer is at least one-half the average pore diameter of the support body.

7. A silica glass filter as claimed in claim 1, wherein the particle size of the third amorphous silica particles of the intermediate layer is at least one-half the average pore diameter of the support body and equal to or less than the average particle diameter of the first amorphous silica particles of the support body.

8. A silica glass filter as claimed in claim 1, wherein said intermediate layer is formed of at least first, second and third layers, and the particles of said first layer have an average particle diameter which is at least equal to one-half the average pore diameter of said second layer and equal to or less than the average particle diameter thereof, and wherein the particles of said third layer have an average particle diameter which is at least one-half the average pore diameter of the filtration layer and equal to or less than the average particle diameter thereof.

9. A silica glass filter as defiend in claim 1, wherein said support body and said filtration layer are formed of powder containing 75wt. % or more of particles having particle sizes ranging within +50% to −50% the average particle size of said support body and said filtration layer.

10. A filter apparatus comprising a silica glass filter as defined in claim 1 and a casing having a fluid inlet and a fluid outlet, said casing being a liquid impermeable body of sintered amorphous silica particles and having a purity of 99.9% or more and containing 150 ppm or less in total of impurities of the group consisting of alkali, alkali metal, heavy metal and elements of III B group of the periodic table, said filter being mounted in the casing between said fluid inlet and said fluid outlet so as to filter a fluid flowing through the casing.

* * * * *

UNITED STATES PATENT AND TRADEMARK OFFICE
CERTIFICATE OF CORRECTION

PATENT NO. : 5,089,134

DATED : February 18, 1992

INVENTOR(S) : ANDO et al

It is certified that error appears in the above-identified patent and that said Letters Patent is hereby corrected as shown below:

Column 1, line 6, before "use" insert --for--; and line 49, "tab," should read --table,--.

Column 3, line 32, "91ass" should read --glass--.

Column 4, line 14, "botain" should read --obtain--;

line 43, $Kgf.cm^{-2}$ should read $Kgf \cdot cm^{-2}$;

line 55, "micron" should read --microns--;

line 56, delete "meters"; and line 68, delete "construction".

Column 5, line 3, "Example 2" should read --Example 3--.

Column 6, line 20, after "prepared" insert --as--; and

UNITED STATES PATENT AND TRADEMARK OFFICE
CERTIFICATE OF CORRECTION

PATENT NO. : 5,089,134

DATED : February 18, 1992

INVENTOR(S) : ANDO et al

It is certified that error appears in the above-identified patent and that said Letters Patent is hereby corrected as shown below:

line 31, "1500°" should read --1150°--.

Column 7, line 1, "The permeabilities" should read --Permeabilities--.

Column 8, line 46, "91ass" should read --glass--.

Column 10, line 21, "microns" should read --microns, respectively--.

Column 11, line 19, "liqud" should read --liquid--; and line 30, "construcion" should read --construction--.

Column 12, line 12, "throught he" should read --through the--;

line 33, "H2SO4" should read --$H_2SO_4$--;

UNITED STATES PATENT AND TRADEMARK OFFICE
CERTIFICATE OF CORRECTION

PATENT NO. : 5,089,134
DATED : February 18, 1992
INVENTOR(S) : ANDO et al

It is certified that error appears in the above-identified patent and that said Letters Patent is hereby corrected as shown below:

line 35, "was" should read --were--; and line 36, "in case of" should read --for--.

Column 13, line 40, after "claim 1" insert a comma --,--.

Column 14, line 32, "defiend" should read --defined--.

Signed and Sealed this

Sixth Day of July, 1993

Attest:

MICHAEL K. KIRK

*Attesting Officer*      Acting Commissioner of Patents and Trademarks